Aug. 1, 1933.  W. SYKES  1,920,900
APPARATUS FOR PRODUCING ELECTRICALLY WELDED PIPE AND TUBING
Original Filed Jan. 9, 1928  2 Sheets-Sheet 1
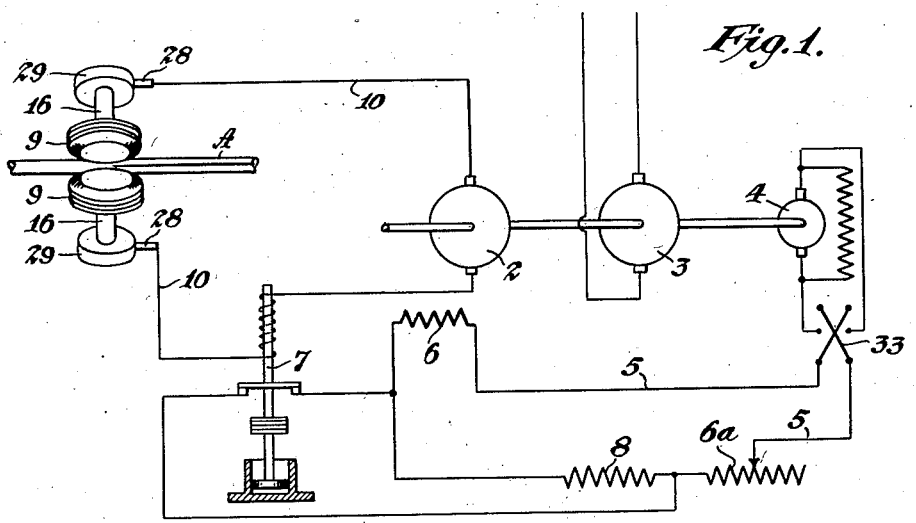
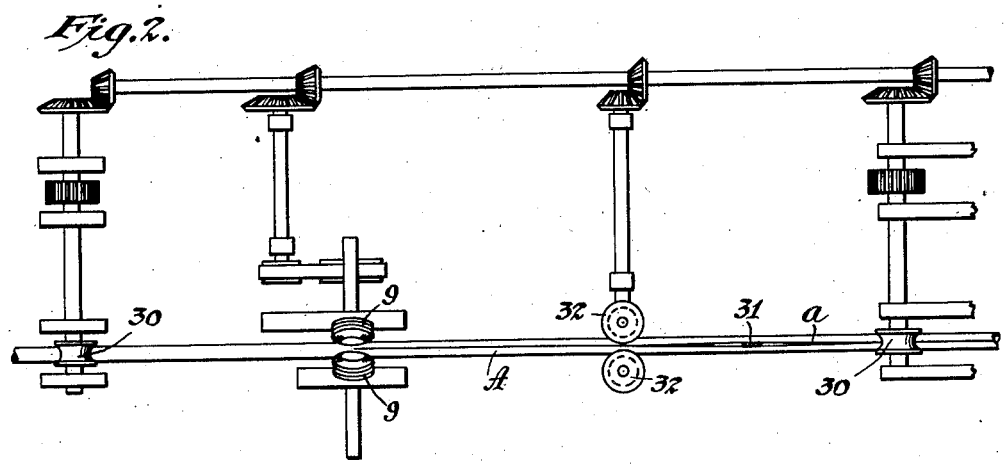
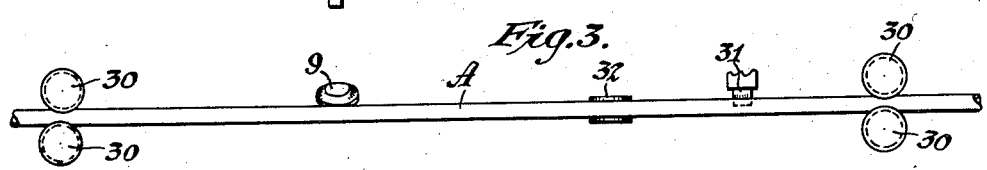
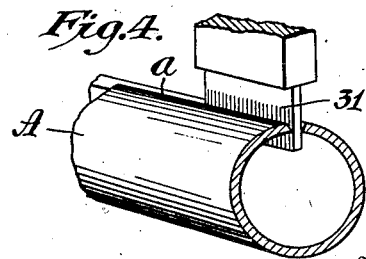
Inventor:
Wilfred Sykes
By his Attorney
Clarence D Kerr

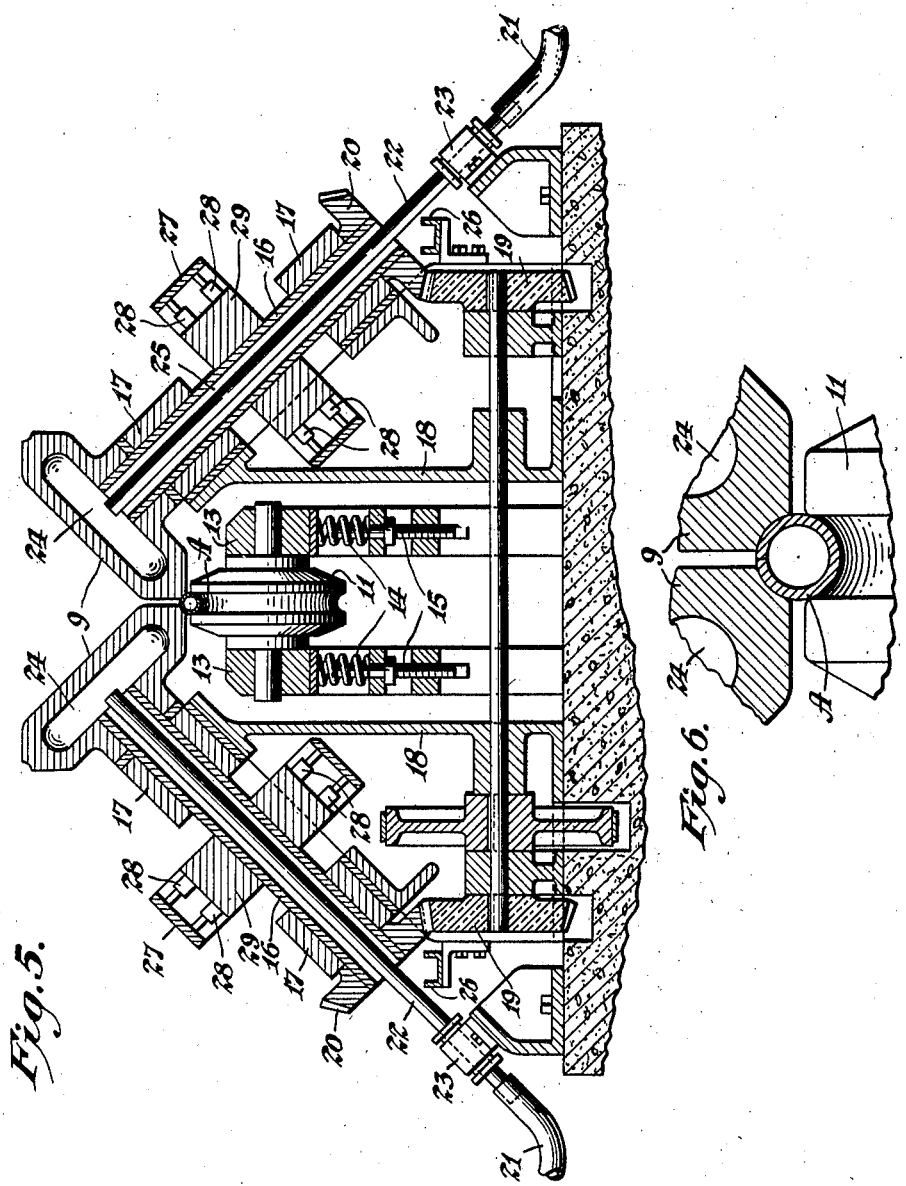

Patented Aug. 1, 1933

1,920,900

UNITED STATES PATENT OFFICE 1,920,900

APPARATUS FOR PRODUCING ELECTRICALLY WELDED PIPE AND TUBING

Wilfred Sykes, Chicago, Ill., assignor, by mesne assignments, to Clayton Mark & Company, Chicago, Ill., a Corporation of Delaware Original application January 9, 1928, Serial No. 245,309. Divided and this application June 5, 1930. Serial No. 459,302

5 Claims. (Cl. 219—6)

My invention relates to electrically welding pipes or tubing. Butt welding thin walled tubing by an alternating current of 10,000 amperes or above applied by water cooled copper rolls adjacent to the welding seam has been extensively used, but in such an operation the periodic variation of the alternating current causes the weld to be more perfect at the points of maximum flow of the current and less perfect at the points corresponding to the zero flow. This action results in a stitch-like and interrupted weld which renders the tubing unfit to withstand internal pressures. I am enabled to overcome these defects and produce a continuous weld by use of direct current supplied by a specially controlled low voltage generator. My invention also comprises various features which I shall hereinafter describe and claim. The present application is a division of my application Serial No. 245,309, filed January 9, 1928.

In the accompanying drawings, Fig. 1 is a diagrammatic view of apparatus and electrical circuits which may be employed in carrying out my invention; Fig. 2 is a plan showing the assembly of the welding rolls with feed rolls and other instrumentalities; Fig. 3 is an elevation thereof; Fig. 4 is a detail of the edging and guiding mechanism; Fig. 5 is a section of the welding and guide rolls and the mountings therefor; and Fig. 6 is an enlarged detailed section of the welding and guide rolls.

Referring more specifically to the drawings, the direct current for welding is supplied by a separately excited generator 2, which is driven by any suitable motor 3, here indicated as a direct current machine. Also driven by the motor 3 is an exciter 4 connected in the circuit 5 with the field 6 of the generator 2 and the adjusting rheostat 6a for that field, the operation of which is controlled by a relay 7 which inserts and cuts out a resistance 8 so that the excitation of the welding generator may vary between predetermined maximum and minimum values. The operation of the relay 7 is controlled by the direct current flowing from the generator 2 to the welding rolls 9 through the main circuit conductors 10, and may be adjusted by any known means so as to make it operate when the current in the welding circuit reaches a predetermined value.

When the resistance 8 is cut into the exciter circuit 5 under steady conditions the current flowing through the welding rolls 9 is less than the desired value, and when the resistance is cut out, the current flowing through the welding rolls is higher than the desired value. Hence, when the relay 7 is properly adjusted it will cut in and short-circuit the resistance 8 at such intervals as would maintain substantially the desired current flow to the welding rolls 9. As the current in the armature of the welding generator 2 does not immediately follow the changes in the exciting current because of the magnetic inertia of the generator field, it is possible with such a relay to maintain a current in the armature circuit which varies but slightly from a constant value.

The frequency at which the resistance 8 is cut in and out of the exciting circuit 5 will vary with the voltage required across the welding rolls 9 to maintain the current desired. If a high voltage is required, the resistance will be cut out of the exciter circuit a greater proportion of the time than if a lower voltage is required.

The resistance 8 is also adjustable so as to permit the desired amount of resistance to be cut out dependent on the voltage which it is desired to use. The voltage may normally be varied from 3 to 6 volts, depending on the wall thickness of the stock to be welded.

The welding unit, best shown in Figs. 5 and 6, comprises the rolls 9 and a supporting or guide roll 11. The two welding rolls are shown in the form of water cooled hopper rolls, preferably inclined at an angle of 45 degrees to the vertical axis of the machine passing through the tubes to be welded, so that the pressure of the rolls 9 is applied across the seam and also vertically on the guide roll 11 underneath the tube to hold it firmly and prevent distortion. The guide roll 11 has insulated bearings 13, and these bearings may be adjusted by springs 14, the compression of which is controlled by bolts 15 to permit the guide roll to adjust itself to variations in pressure and differences in sizes of pipe and to compensate for wear, etc.

The shafts 16 of the welding rolls 9 are mounted in insulated bearings 17 from the frame 18 of the machine, and each roll is driven through the gears 19 and 20, one of which (in this instance the gear 19) is formed of Micarta or other similar insulating material so that there may be no leakage of current through the gears to the other members of the machine. The shaft 16 of each welding roll 9 is hollow so as to provide for a supply of a cooling medium such as water, which passes from the connection 21 through the pipe 22, the lower end of which is carried in the stationary sleeve bearing 23, to the cooling chamber 24 in the roll 9, and the overflow passes out through a channel 25 between the pipe 22 and the inner wall of the shaft 16 and is caught in a drain trough 26, as indicated.

The current is conducted to the welding rolls 9 from the conductors 10 through a stationary brush ring 27, on which the brushes 28 are mounted, to a collector ring 29 secured on the welding roll shaft.

In welding tubes by the instrumentalities just described, the blank or unfinished pipe A, which has previously been formed into tube shape with an open seam a, is advanced by the driven rolls 30 in such manner that a fixed scraper or rasp 31 will project down into the seam a and clean and abrade its edges. The rasp 31 is so positioned that it will at the same time bring the seam a into alignment with the path across which the welding current is intended to pass between the rolls 9.

The blank A is then driven forward into the pass between the rolls 9 and 11 by the horizontally disposed rolls 32, which brings the edges of the seam a together and trues the tube into circular form. As the welding rolls 9 are arranged at an angle of approximately 45 degrees to the vertical axis of the tube, pressure is applied not only to force the edges of the seam firmly against each other, but also to hold the tube firmly in the grooved guide roll 11 underneath. While this welding roll pressure is not such as to cause any upsetting of the edges of the blank when cold, there will be a tendency toward slightly upsetting the edges of the seam when heated in the welding operation. This, however, can be regulated by the adjustment of the welding rolls and the spring mounting of the guide roll. The current is kept constant automatically and the voltage is varied to overcome resistance between the welding rolls. As the blank enters the pass between the welding and guide rolls, the rolls are supplied with direct current from the separately excited generator, controlled in the manner described above, with the result that the pipe at its meeting edges is continuously welded from end to end.

To prevent unequal wear of the contact surfaces of the welding rolls the polarity of the generator 2 can be changed by means of a reversing switch 33 in the exciter circuit. The direction of current may thus be reversed for each alternate length of pipe, but should not be reversed during the welding of any single length of pipe.

It will be seen that a workman with ordinary skill can without difficulty adjust the setting of the relay to the thickness of the material and the speed of the welding rolls and thereby insure the flow of a substantially constant direct current across the joint to be welded, which will secure a continuity of welding not attained by any of the methods heretofore in use.

Tubes or pipe may be welded by the method just described at a high speed and such tubes and pipes will be found to be uniformly welded and have a substantially uniform wall thickness at the weld, for while in some instances there is a slight burr, this burr is very generally of uniform character and, in any event, the welded metal in the region of the seam is substantially of the same thickness, uniformity and texture as those portions of the tube wall which are unaffected by the welding operation.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. In apparatus for electrically welding a tube blank, a pair of rotary welding electrodes intended to engage the exterior of the tube and supply a direct current flow across the seam to be welded; a separately excited generator supplying direct current to said electrodes, and means for changing the polarity of the generator to reverse the current flow through the electrodes to prevent unequal wear on the surfaces of the electrodes.

2. In apparatus for electrically welding a tube blank, a pair of welding electrodes for engaging a tube on opposite sides of the seam to be welded, means for causing the tube to travel longitudinally while engaged by said electrodes, and a separately excited direct current generator connected to said electrodes for supplying current thereto, and means for varying the strength of the field of said generator to regulate the voltage supplied thereby.

3. In apparatus for electrically welding a tube blank, a pair of welding electrodes, each electrode being mounted upon a rotatable shaft, and driving means for each shaft including a gear meshing with a gear on the shaft, one of said gears being formed of insulating material.

4. In apparatus for electrically welding a tube blank, a pair of welding electrodes for engaging the tube on opposite sides of the seam to be welded, means for causing the tube to travel longitudinally while engaged by said electrodes, and means for supplying to said electrodes a direct current of substantially constant value for thereby causing the walls on the opposite sides of the seam to be formed into a continuous and uninterrupted weld, said means comprising a separately excited direct current generator connected to said electrodes.

5. In apparatus for electrically welding a tube blank, a pair of welding electrodes for engaging a tube on opposite sides of the seam to be welded, means for causing the tube to travel longitudinally while engaged by said electrodes, and a separately excited direct current generator connected to said electrodes for supplying current thereto, and means controlled by the welding current for varying the strength of the field of said generator to regulate the voltage supplied thereby.

WILFRED SYKES.